United States Patent [19]
Mukherjee

[11] Patent Number: 5,487,080
[45] Date of Patent: Jan. 23, 1996

[54] PRINCIPLE AND APPLICATIONS OF MULTIPHOTON PUMPED UPCONVERTED LASERS

[75] Inventor: Anadi Mukherjee, Albuquerque, N.M.

[73] Assignee: University of New Mexico, Albuquerque, N.M.

[21] Appl. No.: 29,838

[22] Filed: Mar. 11, 1993

Related U.S. Application Data

[63] Continuation-in-part of Ser. No. 787,309, Oct. 30, 1991, abandoned.

[51] Int. Cl.$^6$ ........................................ H01S 3/09
[52] U.S. Cl. .............................. 372/69; 372/53
[58] Field of Search .................. 372/69, 70, 71, 372/32, 39, 78, 53

[56] References Cited

U.S. PATENT DOCUMENTS 3,922,061  11/1975  Glass et al. ................................ 359/7
5,115,488  5/1992  Islam et al. ............................. 385/129

OTHER PUBLICATIONS

X. H. Yang, J. M. Hays, W. Shan, and J. J. Song and E. Cantwell Two Photon Pumped Blue Lasing in Bulk ZnSe and ZnSSe Appl. Phys. Lett., 62 (10), 8 Mar. 1993 pp. 1071–1073.

Yoh Milta, Y. Wang, and S. Shionoya High Brightness Blue and Green Light Sources Pumped with a 980 nm Emitting Laser Diode Appl. Phys. Lett. 62 (8), 22; Feb. 1993 pp. 802–804.

V. A. Zaporozhchenko, A. V. Kachinskii, M. V. Korol'kov, and O. V. Chekhlov Some Features of Ultrashort Pulse Generation in a Distributed Feedback Dye Laser with Two Photon Pumping Sov. J. Quantum Electron 19 (9) Sep. 1989 pp. 1179–1181.

P. Qiu and A. Penzkofer Intense Ultrashort Pulse Generation in a Two–Photon Pumped Generator Amplifier System Appl. Phys. B 48, 115–124 Jan. (1989).

*Primary Examiner*—Rodney B. Bovernick
*Assistant Examiner*—Robert E. Wise
*Attorney, Agent, or Firm*—Albert Sopp; Robert Becker

[57] ABSTRACT

The principle and some applications of multiphoton pumped upconverted lasers (MU-LASER) in complex molecules like said material is demonstrated. Weak linear absorption and strong multiphoton absorption and upconverted fluorescence of said material in the form of integrated waveguides is responsible for the MU-LASER action of upconverting narrow band infrared wavelength to visible spectrum of bandwidth~50 nm and peak at 570 nm. Applications in efficient upconversion of diode laser wavelengths, displays, and two types of surface-emitting MU-LASERs for high definition television (HDTV) are produced.

19 Claims, 12 Drawing Sheets

PRINCIPLE AND APPLICATIONS OF MULTIPHOTON PUMPED UPCONVERTED LASERS

This patent application is a continuation-in-part of patent application Ser. No.787,309 filed on Oct. 30, 1991 and now abandoned.

FIELD OF THE INVENTION

The invention is in the field of compact lightweight integrated visible lasers, and their applications in upconverting diode lasers for signal processing, optical storage, visible displays, spectroscopy, medical diagnostics/surgery and high definition television (HDTV).

BACKGROUND OF THE INVENTION

There is a need to provide compact, lightweight, inexpensive coherent light sources in the entire visible spectrum i.e., visible lasers. A further convenience would be to use commercially available efficient diode lasers for pumping these visible lasers. The available He-Ne lasers (632.8nm) and visible diode lasers (650 mm) made from quaternary semiconducting materials are in the red region of the spectrum only and further, are either too weak or too narrow bandwidth of emission or too large to meet most of the application requirements. Applications of compact visible lasers include medical diagnostics, surgery, metrology, optical storage, display, HDTV, submarine-satellite communication and other areas. Efficient high power diode lasers (more than 20 Watts of quasi-cw power) are commercially available in the infrared and near infrared wavelengths (zero dispersion with very low propagation loss in optical fibers) for large scale applications in optical communication. The attempts so far, in upconverting these diode lasers have been in the areas of efficient cavity designs for second harmonic generation or very low temperature (~50 degrees Kelvin) laser operation of rare earth ion doped solid state materials, often involving expensive nonlinear crystals and elaborate mechanical and optical alignments. The research on dye doping in solid host materials for waveguide lasers (J. C. Altman et al. in IEEE Photonics Technology Letters, Vol. 3, No. 3, p189, Mar., 1991 and references therein) have had very limited success due to photodegeneration of dyes which are not recycled as in a liquid dye laser.

Figure 1A:
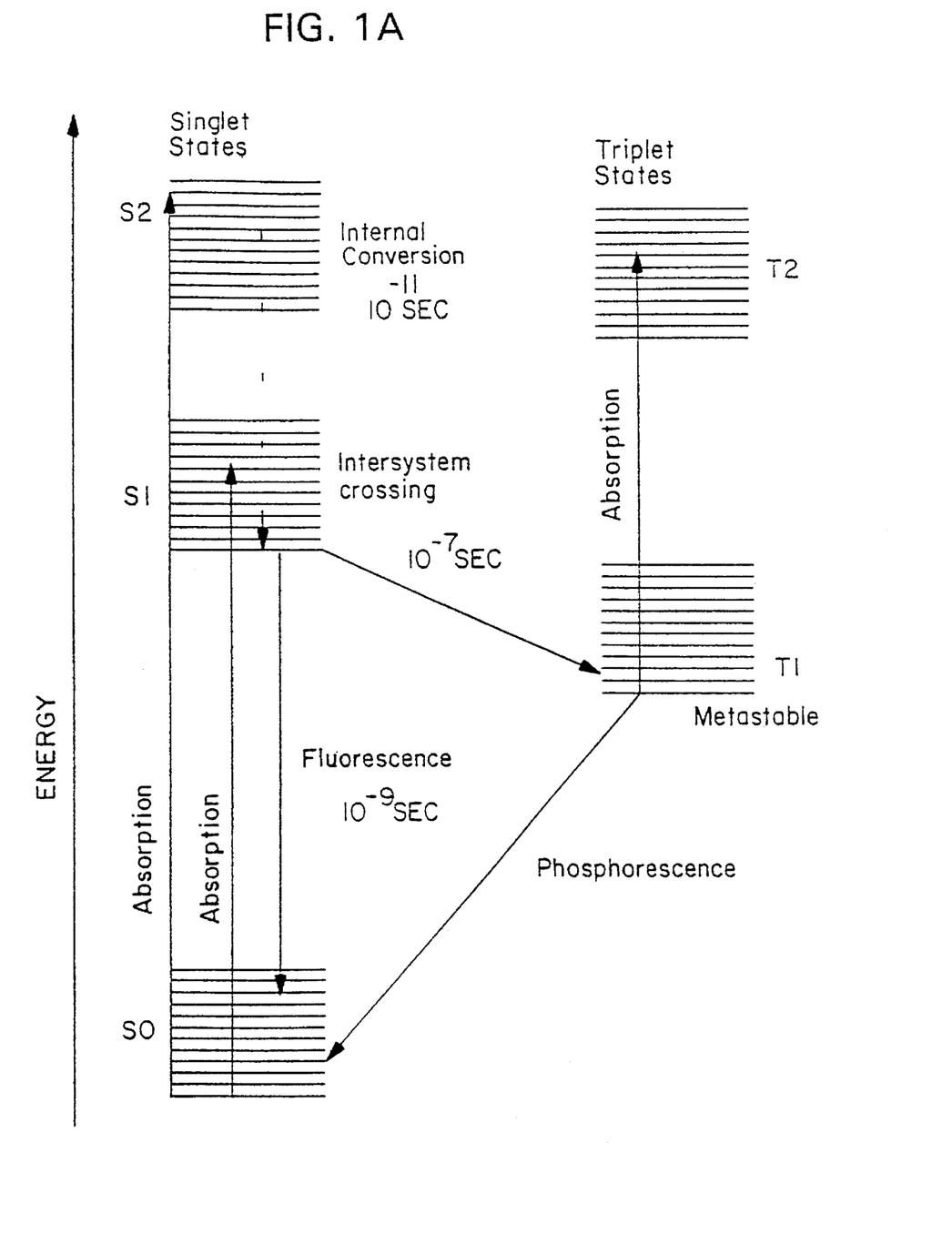
FIG. 1A is a diagram showing the energy levels of a typical dye molecule.
Figure 1B:
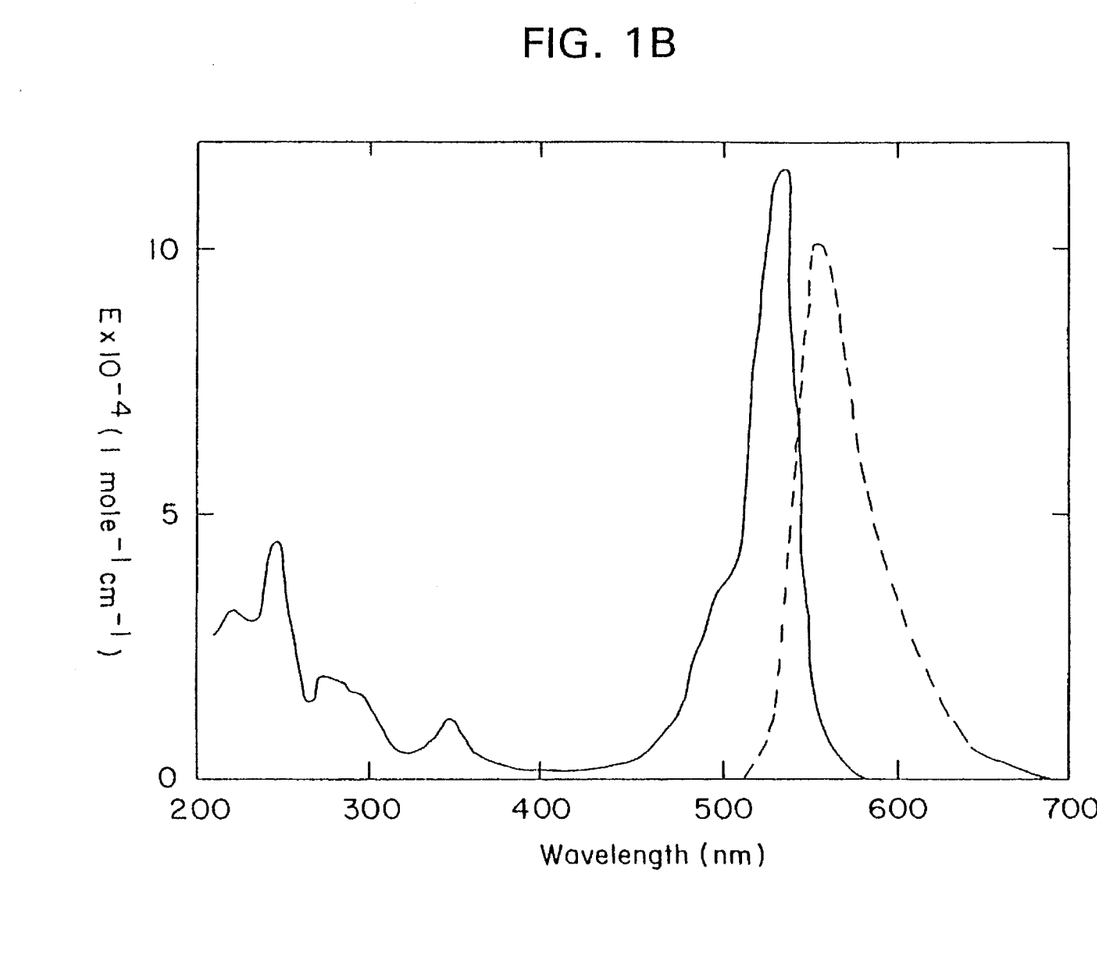
FIG. 1B is a graph showing the absorption / emission spectrum of Rhodamine 6G dye molecule.

The energy level diagram and absorption/emission of a typical dye molecule (Rhodamine 6G) is shown in FIGS. 1A and 1B. The singlet (total electron spin=0) and triplet (total electron spin =1) manifold of electronic energy states with the associated rotational-vibrational levels of a dye molecule is shown with a linearly increasing energy scale as the ordinate. The ground energy state of the dye molecule is designated by the symbol $S_O$ the singlet state of lowest energy. It includes a range of energies determined by the quantized vibrational and rotational states of the molecule. The energy spacing between the vibrational states range from 1400 to 1700 $cm^{-1}$. The rotational state spacing is about two orders of magnitude smaller than the vibrational states. A near continuum is thus formed.

When light is absorbed, the molecule is excited from the ground state to a vibrational-rotational level of an excited state $S_1$ or higher. After excitation, a thermal distribution of the population takes place within $10^{-11}$ seconds among the continuum of sublevels. Molecules can also be excited to the second excited singlet state $S_2$ by either (1) absorption of a photon by an already excited molecule in the S1 state or (2) absorption of a single photon (usually ultraviolet) directly by a molecule in the ground state or (3) two-photon absorption of a molecule in the ground state. Nonradiative decay then occurs from the $S_2$ state to the $S_1$ state in a time of $10^{-10}$ seconds.

In other words, as dye molecules are currently understood, once they are in an excited state (either S1 or S2), they relax thermally (i.e., nonradiatively) to the low lying vibrational-rotational levels of the S1 state in a maximum time of typically $10^{-10}$ seconds (Karl H. Drexhage, Chapter 5 of "Dye Lasers", Ed. F. P. Schaefer, Topics in Applied Physics, Vol.1, Springer-Verlag). From what has been reported so far, a few molecules (less than 5%) undergo intersystem crossing and energy is transfered to excited triplet states. Triplet states have been known to be metastable with microsecond or longer lifetimes. Thus, molecules caught in triplet states for such long times are a major source of loss of efficiency of dyes as a laser medium. This is basically photobleaching or photodegradation of dyes.

A molecule in the $S_1$ state can then return to $S_O$ state by emitting a photon whose energy is less than the absorbed light. This $S_1 \rightarrow S_O$ radiative transition gives rise to spontaneous and stimulated emission in laser dyes. The spectrum of a typical absorption and emission of a dye molecule is shown in FIG. 1B. The high rate of spontaneous emission from $S_1 \rightarrow S_O$ with radiative lifetimes of the order of nanoseconds is responsible for the high gain in dye lasers, often several orders of magnitude larger than solid state lasers.

The principle used in the waveguide lasers discussed in the above-mentioned article of Altman et al has been conventional, i.e., being pumped at the absorption maximum of the dye which then lases in the longer wavelengths. Structure and properties of laser dyes have have been very well documented by Karl H. Drexhage in the above mentioned reference.

Low loss optical waveguides offer the potential for propagating high intensity beams (intensity >100 $MW/cm^2$) over long distances. Waveguide materials with strong nonlinear absorption and minimum linear absorption offer good potential for efficient upconversion. If the energy levels responsible for upconversion fluorescence allow population inversion then by use of any suitable feedback such as holographic gratings or mirrors at the end of the waveguide, one can achieve an integrated upconverted laser. This is the principle of multiphoton pumped upconverted laser, named as MU-LASER.

SUMMARY OF THE INVENTION

In accordance with the present invention there are provided multiphoton pumped upconverted lasers, or "MU-LASERS" as they will henceforth be called herein. MU-LASERS are provided by materials capable of efficient upconversion of light via strong multiphoton absorption (more than one photon absorbed simultaneously) and weak linear absorption. Waveguides of these materials with appropriate feedback (such as gratings) at the ends provide compact lightweight integrated form of MU-LASER. As an example shown herein, dye-doped polymer waveguides are excited via strong two-photon absorption (TPA) and very weak linear loss (absorption and scattering) and resulting upconverted fluorescence from the energy levels S1→S0 (lasing levels of this dye) are identified. This principle is applicable to materials with energy levels satisfying the MU-LASER principle of this invention such as organic and inorganic compounds as well as dielectric and semiconducting materials including but not limited to ZnSe, ZnS, CdSe, CdS. In other words, according to this invention, waveguide of any material with low linear loss but capable of upconversion fluorescence due to strong multiphoton absorption (two-photon, three photon etc.) can be used to generate coherent upconverted light. Dye doped waveguides are patterned from 4-Dicyanomethylene-2-methyl-6-p- dimethylaminostyryl-4H-pyran obtained from Exciton Laser Dyes Co. and known as DCM, doped in commercially available polymer (organic plastic) polymethylmethachrylate obtained from KTI Chemicals Inc. known as PMMA. When waveguides of this doped polymer are pumped by a pulse train of picosecond ($10^{-12}$ second) pulses (of pulsewidth 4 picoseconds and 82 MHz repetition rate) in the near infrared wavelength of 740 nanometers(nm) of average power 10 milliwatts (30 Watts peak power), an untuned, upconverted lasing spectrum of spectral width ~ 50 nm centered at 570 nm is observed. The lasing levels identified are the singlet electronic energy states $S_1$ and $S_0$.

The lack of linear absorption and input - output power dependence shows that the dye is pumped by a simultaneous two-photon absorption process. This simultaneous two-photon absorption and upconverted lasing is distinctly different from the rare earth ion doped solid state materials as reported recently by R. A. McFarlane in Optics Letters, Vol 16, No. 18, Sep. 15, p1397, 1991 and references therein where single-photon resonant intermediate states involve dominant linear loss. The laser arrangement of the invention is useful in waveguide and surface emitting MU-LASERS. The waveguide MU-LASERS of the invention provide efficient diode laser upconversion for use in compact disc (CD) recorders/players, laser scanning, printing etc. and flat panel displays. In accordance with the invention, surface emitting MU-LASERS are also useful for two types of high definition television (HDTV) i.e., for image broadcasting in the visible spectrum.

BRIEF DESCRIPTION OF THE DRAWINGS

Reference is now made to the drawings in which like reference numerals may refer to like parts and in which.

DETAILED DESCRIPTION OF THE INVENTION

In accordance with the invention, referring to FIGS. 1–5, two-photon pumped strong upconverted lasing has been produced in certain dye laser materials such as aforementioned DCM dye doped PMMA waveguides, both materials being commercially available.

The preparations of such waveguides are as follows in accordance with an embodyment of the invention. Typically SiO2 films about 2.6 micrometers thick are wet themally grown on Si wafers. A concentration of about 5 millimole of DCM dye is dissolved into PMMA (9% solids, 496 K) suspended in cholorobenzene and spin coated at 600 rpm on SiO2 on Si substrates resulting films of thickness about 3.5 micrometers. The film is soft baked at 90 C. for 60 minutes to evaporate the solvent cholorobenzene. Then a UV (ultraviolet) laser write process is used to photopolymerize and pattern the waveguides. The UV laser (257 nm) used can be an intercavity frequency doubled Ar-laser focussed to 20 micrometers spot size on the film mounted on a computer controlled translation stage. A typical fluence that results in clean waveguides is about $10^4$ J/cm2. The photopolymerized areas are removed when washed in the developer(IPA:M-IBK, 1.8:1) leaving behind clean slab waveguides. Waveguides of desired lengths are obtained by cleaving the Si substrate.

The refractive index of the film at the pump wavelength of 740 nm is 1.49. The refractive index of SiO2 being 1.46 gives a step index difference of 0.03 in the asymmetric waveguide. For a thickness of t=7 micrometers of the double coated film used in these measurements, there are 5 propagating TE modes through the waveguide. Also fibers of this dye-doped polymer material were fabricated as follows. A $10^{-3}$ mole concentration of DCM in benzyl alcohol (BZOH) solution (BZOH may be used to quicken the doping process but is not an essential part of the preparation )is homogeneously mixed in PMMA. Fibers of waveguides are drawn from this viscous PMMA solution and laid on fused silica substrates and dried in a furnace at 120 degrees centigrade for four hours. Fused silica is a convenient substrate since its refractive index in the visible spectrum is about 1.46 while the refractive index of the waveguide is about 1.49. The substrate with the dried waveguides is carefully cleaved to give 2 to 3 mm long waveguide segments. The fabricated waveguides (either laser fabricated or pulled fibers) are then mounted on a convenient holder for endfire coupling of the infrared pump beam.

Figure 2:
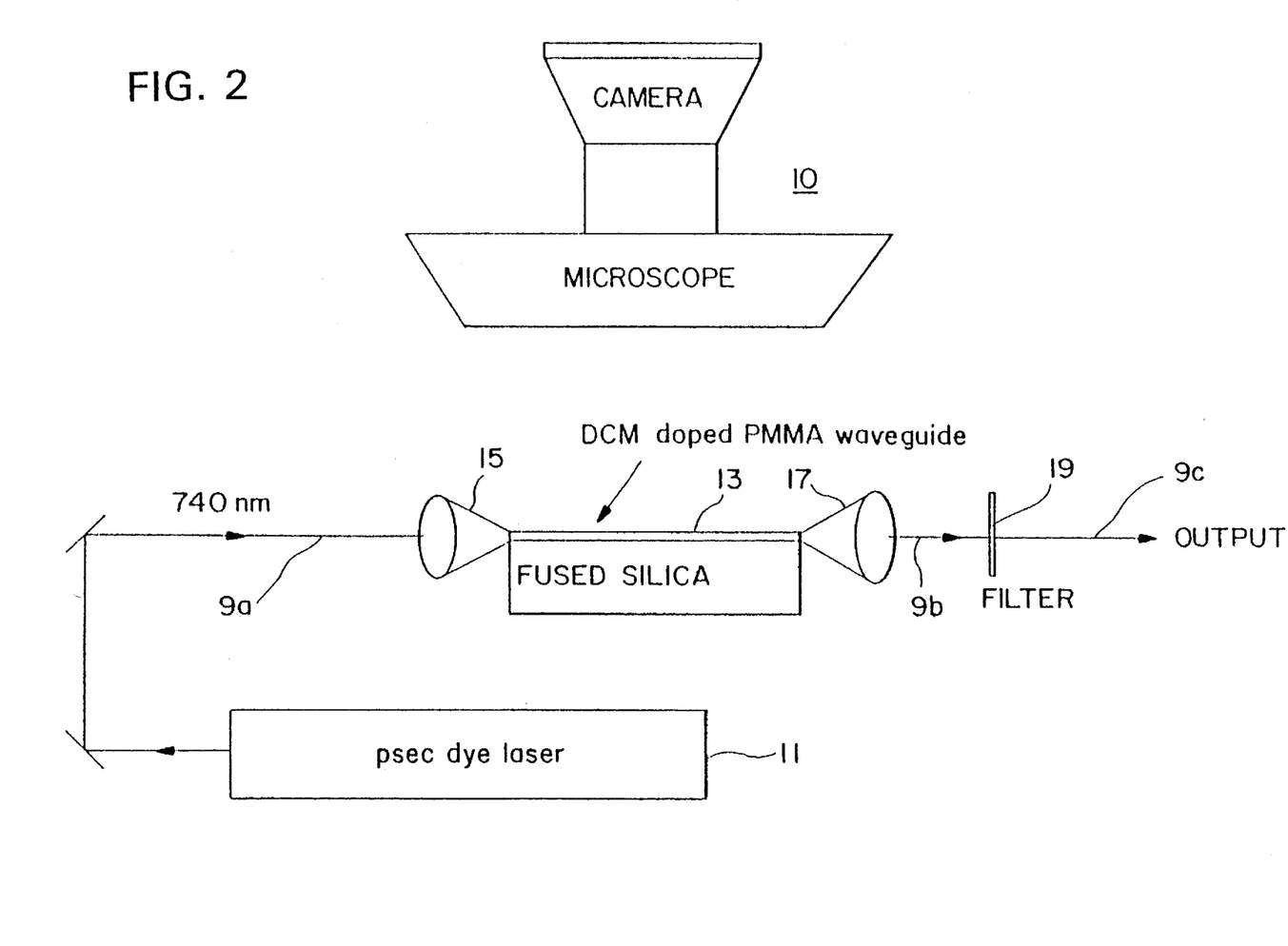
FIG. 2 is a schematic block diagram showing a multiphoton pumped upconverted lasing arrangement in accordance with an embodiment of the invention.
Figure 3:
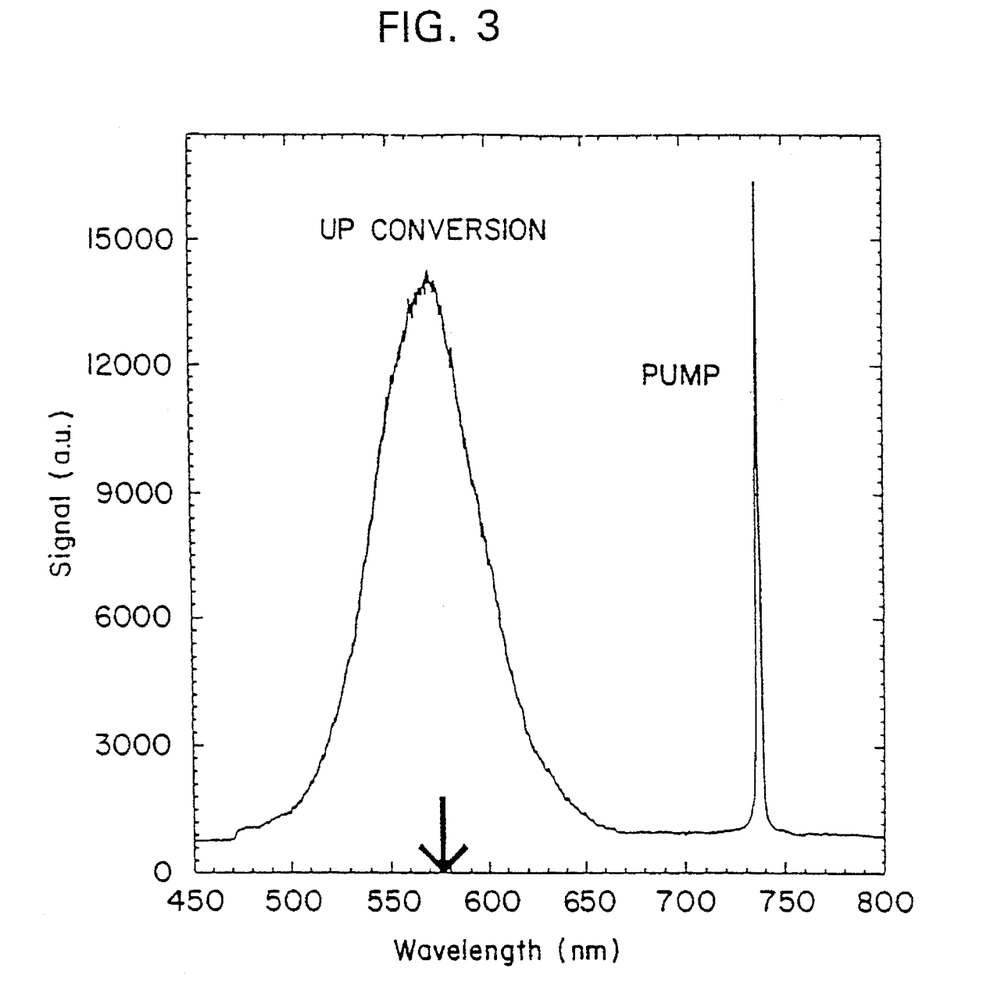
FIG. 3 is a graph showing the upconverted lasing spectrum produced in accordance with an embodiment of the invention as measured by an optical multichannel analyzer. The arrow shows the location of the fluorescence peak when the waveguide is pumped conventionally by single-photon excitation at 488 nm.

As shown in the upconverted lasing arrangement of FIG. 2, a commercially available synchronously pumped picosecond (psec) dye laser obtained from Spectra Physics, operating at 82 MHz repetition rate and 4 picoseconds pulsewidth at a wavelength of 740 nm provides the pump beam source 11. A beam 9a, average power of about 10 mW produced by the infrared pump source is focussed into one end of a typically 5 to 10 micrometers thick DCM dye doped PMMA waveguide 13 of well known construction via a 50×microscope objective lens 15. The optical beam from the other output end of the waveguide 13 is collimated using a 50×microscope objective lens 17 and filtered using a Schott filter glass 19 to remove the residual infrared wavelength pump beam 9b, which was attenuated only slightly by two photon absorption. The resulting transmitted beam 9c is dominantly yellow and bright enough to be seen on a white paper placed on the beam path. This waveguide MU-LASER beam 9c is seen fluorescing at all other colors from blue to red as shown in FIG. 3 when observed through several filters. The spectrum of this beam 9c as taken in an optical multichannel analyzer (OMA) shows a peak wavelength of 570 nm and a bandwidth of ~50 nm. The arrangement may conveniently be observed with a microscope and camera 10.

The beam 9c is substantially collimated over a distance of 20 feet, a signature of a spatially coherent laser beam. The lasing in the dye doped polymer waveguide is in the form of single pass amplified spontaneous emission (ASE). The output power of the beam 9c when analyzed using any suitable well known detector and power meter (obtained from Coherent Inc.) show that the power conversion efficiency of this laser is at least 10%, indicating suitability for a very efficient MU-LASER.

Materials having molecules behaving like DCM can produce similar actions, in other regions of the electromagnetic spectrum with similar efficiencies of lasing action based on MU-LASER principle in accordance with the invention.

The spectrum of the output beam 9c produced by the MU-LASER arrangement of FIG. 2 is shown in FIG. 3.

The present invention provides a distinctly different process from that reported by R. A. McFarlane, cited above and the references cited therein concerning ion doped crystals where a cascade of two single photons were absorbed one at a time with a real metastable intermediate state. In other words according to McFarlane, a single photon was absorbed to a metastable state from which another photon was absorbed to a higher excited state to enable narrow band upconversion. This system is dominated by linear absorption of the pump beam in the lasing media.

In the MU-LASER of this invention involving two-photon pumped upconversion, there is no single photon absorption since the one photon energy level does not correspond to any real state to cause any absorption. In accordance with the MU-LASER principle of the present invention, propagation lengths of the pump beam can be very large, an ideal condition for longitudinally pumped waveguide lasers. Two-photon absorption pumped downconversion has been reported by J. Y. Aliain et. al. in Electronics Letters, Vol 26, p166, 1989 where the down conversions ranged from 676.4 nm and 647.1 nm to 1.51 micron wavelengths. Two-photon absorption pumped upconverted lasing (Ref. Zaperozhchenko et. al.) and amplified spontaneous emission (Ref. P. Qiu and A. Penzkofer) have been reported for semiconductor laser crystals and liquid solutions of laser dyes. Thus, the MU-LASER according to this invention provides for the first time a multiphoton pumped upconverted lasing action in a waveguide, where the linear loss is much less compared to the nonlinear absorption.

Figure 6:
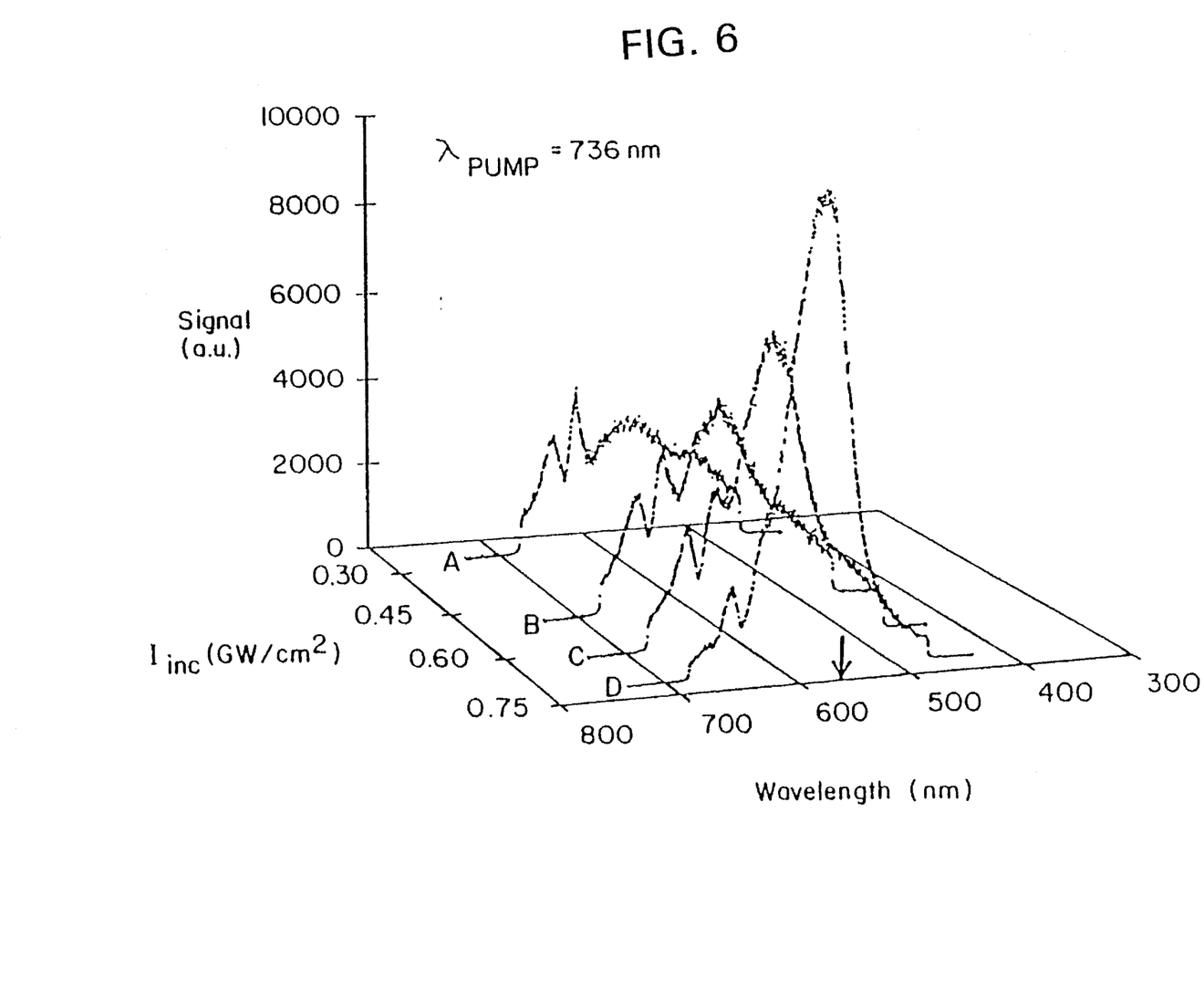
FIG. 6 is a graph showing the associated spectral narrowing for a pump intensity higher than shown in FIG. 4B.

A photograph of a lasing waveguide shown in FIG. 6, taken through a Bausch & Lomb microscope (30×magnification), shows the bright yellow lasing streak or beam 9c (lasing maximum) as scattered from the waveguide. This yellow beam as seen in this photograph is part of the laser beam 9c (see FIG. 2) that is scattered in all directions away from the plane of the waveguide 13. The main upconverted laser beam is shown as the output beam 9c. The microscope and the camera arrangement 10 which may be used for taking the photograph of FIG. 6 is shown in FIG. 2.

FIG. 3 shows the pump and upconversion spectra as taken by an OMA. The upconversion spectrum is peaked at 570 nm and has ~50 nm bandwidth. To identify the energy levels involved in this emission, the waveguide is conventionally pumped by single photon absorption at 488 nm from continuous wave Argon laser. The resulting fluorescence also has the same peak (shown by the arrow) as the one pumped by TPA. This is consistent with the state of art knowledge of energy dynamics of laser dyes, i.e. the electrons excited by TPA undergo ultrafast relaxation to the bottom vibrational level of S1 shown in FIG. 1A. From here the electrons undergo a same radiative transition to S0 as seen when excited by single photon absorption (488 nm). Thus these nonlinear transmission measurements show that the dye doped PMMA waveguides are indeed pumped by a pure TPA process.

The propagation behaviour of the intensity of the laser beam undergoing linear and TPA is given by the well-known relation:

$$\frac{dI}{dz} = -[\alpha + \beta I]I \quad (1)$$

where $I = I(z,r,t)$ is the laser intensity after propagating a distance $z$; $r$ is the radial coordinate and $t$ is the time. $\alpha$ and $\beta$ are the linear and TPA coefficients respectively. The coefficient $\alpha$ takes into account both absorption and scattering in the waveguide. Integration of Eq. (1) over the propagation length 1 of the waveguide and defining transmission as $T = I(r,t)/I_0(r,t)$ produces:

$$\frac{1}{T} = \frac{1}{T_1 T_2 e^{-\alpha l}} + \frac{\beta \left( \frac{1 - e^{-\alpha l}}{\alpha} \right)}{T_2 e^{-\alpha l}} I_0(r,t) \quad (2)$$

where $T_1$ and $T_2$ are the transmissions into and out of the waveguide respectively. The linear dependence of $1/T$ on the incident intensity $I_0(r,t)$ in the waveguide is the signature of TPA. When $T_1$ and $T_2$ are well estimated, the values of $\alpha$ and $\beta$ can be deduced from the intercept and slope of the straight line fit to the data. The intensities defined so far have radial and temporal dependencies. The intensity of the laser beam across the waveguide crossection is taken to be flat due to multimode propagation, neglecting spatial integration over the mode intensity profiles in the waveguide. The time integration of $I_0(r,t)$ for a Guassian temporal pulseshape of FW1/eM=4ps has been incorporated in the data.

The TPA crossection $\sigma^{(2)}$ in $cm^4$-s/photon-molecule is defined as:

$$\sigma^{(2)} = \frac{\hbar \omega}{N} \beta \quad (3)$$

Where $\hbar \omega$ is the energy per single incident photon and $N$ is the number of dye molecules per unit volume.

Figure 4A:
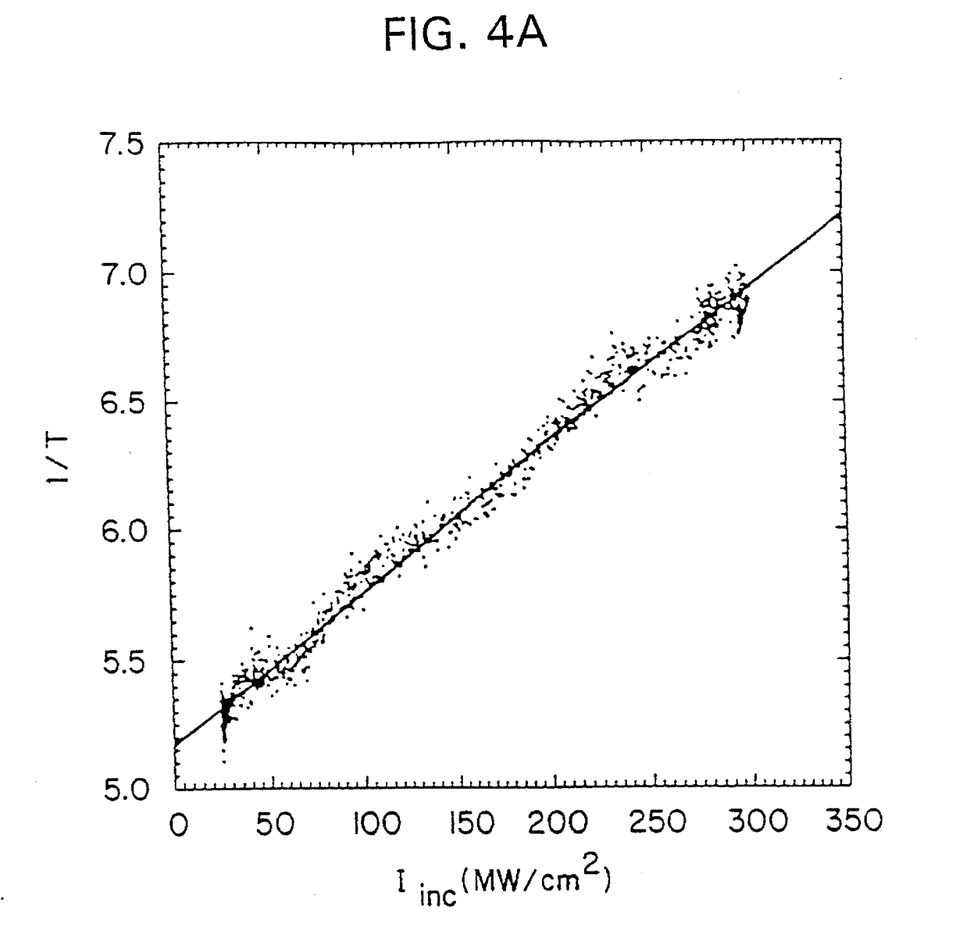
FIG. 4A is a graph showing the inverse transmission versus the incident intensity on the dye-doped polymer waveguide. The linearity shows that the two-photon absorption (TPA) is the dominant loss.
Figure 4B:
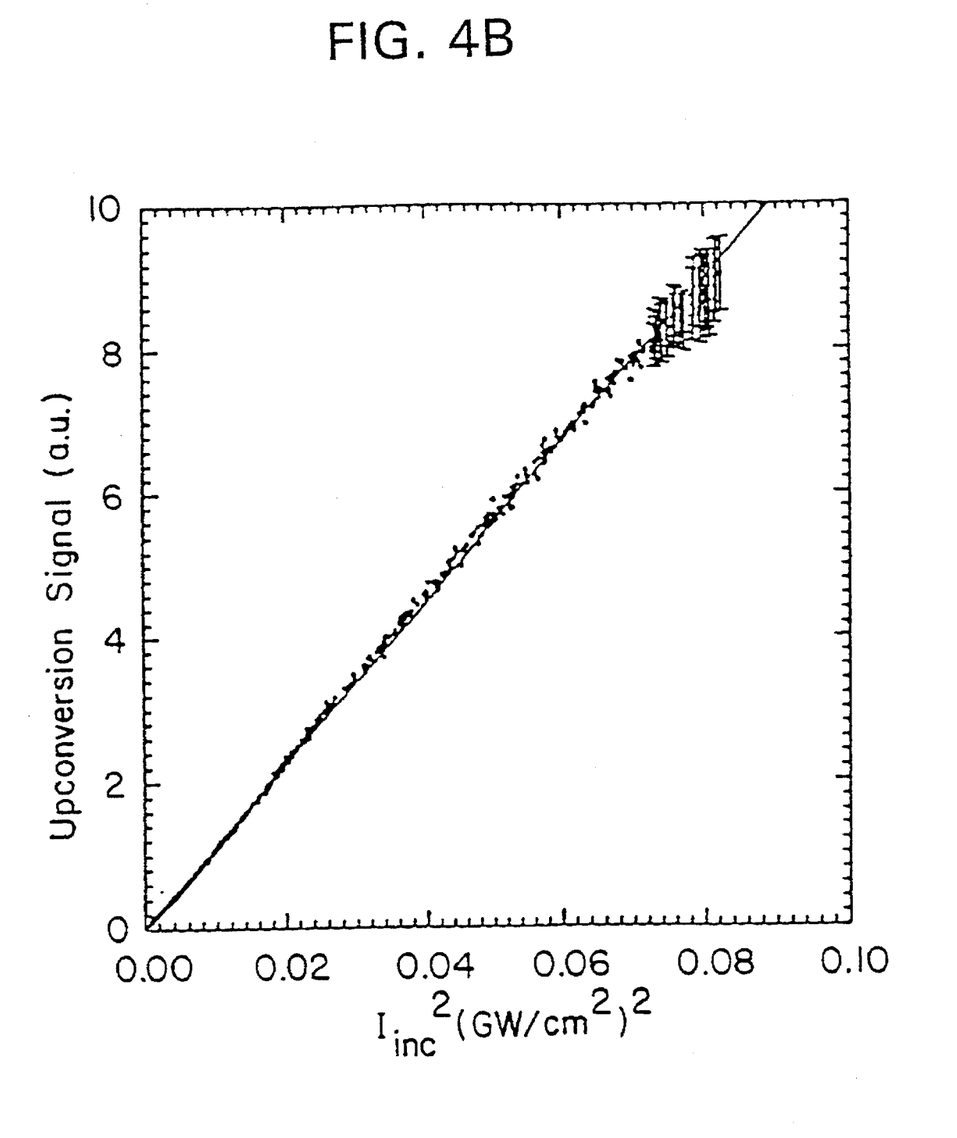
FIG. 4B is a graph showing the linear dependence of the upconversion signal in the visible spectrum versus the square of the input pump power in the infrared wavelength of 740 mm, which also demonstrates that TPA is the pumping arrangement in accordance with an embodiment of the invention.

The linear dependence of $1/T$ on the incident intensity demonstrates the TPA phenomenon. This is illustrated by the experimental data points of FIG. 4A. From the best fit straight line to this data, the value of TPA coefficient and TPA crossection are evaluated to be $\beta=16$ cm/GW and $\sigma^{(2)}=146\times10^{-47}$ cm$^4$-s respectively. This large value of TPA crossection of DCM in PMMA also suggests that the nonlinear index of refraction $n_2$ may be large from Kramer-Kronig relations. FIG. 4B shows the linear behaviour of upconversion signal versus square of the input pump intensity. In addition to the nonlinear transmission measurements, this also shows that TPA is the pumping mechanism responsible for the generation of the upconversion signal.

Figure 5:
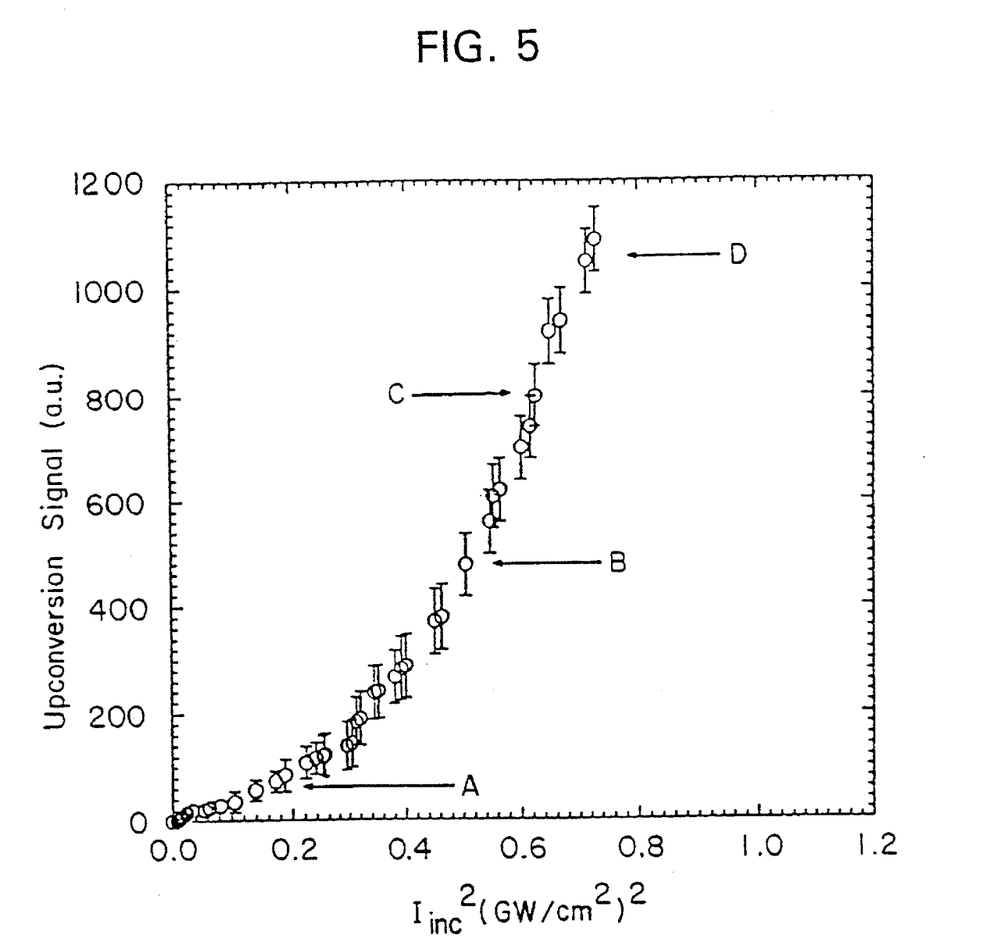
FIG. 5 is a graph showing amplified spontaneous emission of the upconverted signal.

A nonlinear dependence of the upconversion signal on the square of input pump intensity is observed when the dye doped PMMA waveguide is pumped at an intensity higher than in FIG. 4B. This points to the fact that as the pump pulse is propagating down the waveguide, the tailing spontaneous emission (higher frequency-slower phase velocity) seeing the inverted medium created by the pump beam. This process yields an amplification of the spontaneous emission (ASE) shown in FIG. 5A and is known in the literature as single pass gain or "swept-gain" laser. Also, it is known that for a homogenously broadened medium such as laser dyes (like DCM) ASE will be associated with a corresponding narrowing of the spectrum. This spectral narrowing associated with the ASE is also observed as shown in FIG. 6B. The spectra taken at various intensities of the pump beam are shown with the help of arrows. This demonstrates the principle of operation of the MU-LASER. Materials having strong nonlinear absorption and weak linear loss like DCM doped in PMMA can produce similar actions in other regions of the electromagnetic spectrum on the MU-LASER principle in accordance with the invention.

Ultrashort light pulses are known to be generated by ASE of laser dyes. In this manner the MU-LASERs in accordance with this invention are capable of providing compact sources of ultrashort (picoseconds and shorter pulsewidths) light pulses in the visible spectrum needed in various applications. In addition, passive and active modelocking of MU-LASERs will result in compact, lightweight visible coherent source of ultrashort light pulses. Also the MU-LASER of the invention enables flat panel displays, HDTVs and other imaging arrangements.

In essence, materials and designs needed for MU-LASERs are as follows. The laser medium should have minimum linear loss (absorption and scattering) and strong multiphoton absorption like TPA in the example given here. The MU-LASER designs are essentially integrated waveguides and doped fibers in accordance with this invention. Low linear loss waveguides of the above mentioned material, DCM doped PMMA, allow a distribution of the gain and efficient upconversion over long length of the material through which the pump intensity remains strong, an essential requirement for uniform multiphoton absorption.

The MU-LASER of this invention lends itself to a wide variety of applications, which form part of the present invention and some of which are described below.

Waveguide MU-LASERS (a) High density optical memory

Figure 7A:
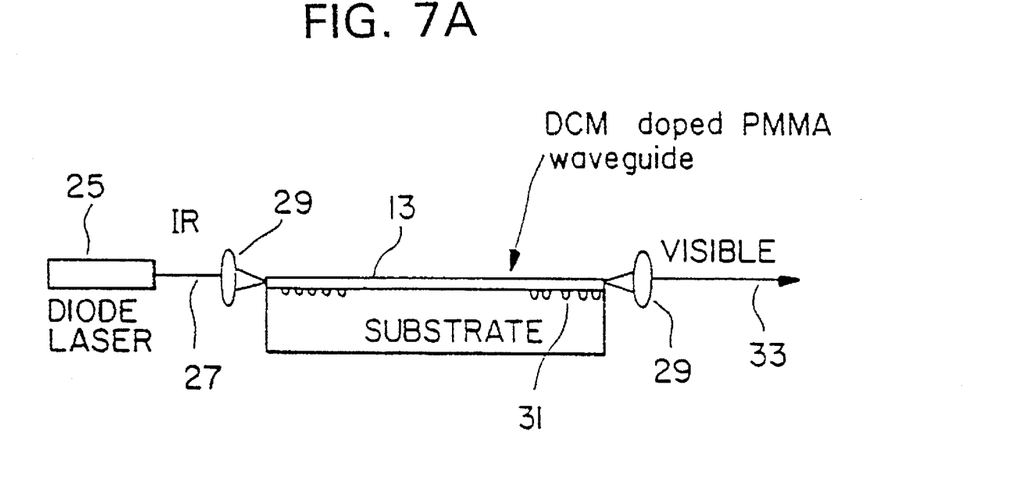
FIG. 7A is a schematic diagram of a diode laser upconversion arrangement in accordance with an embodiment of the invention.
Figure 7B:
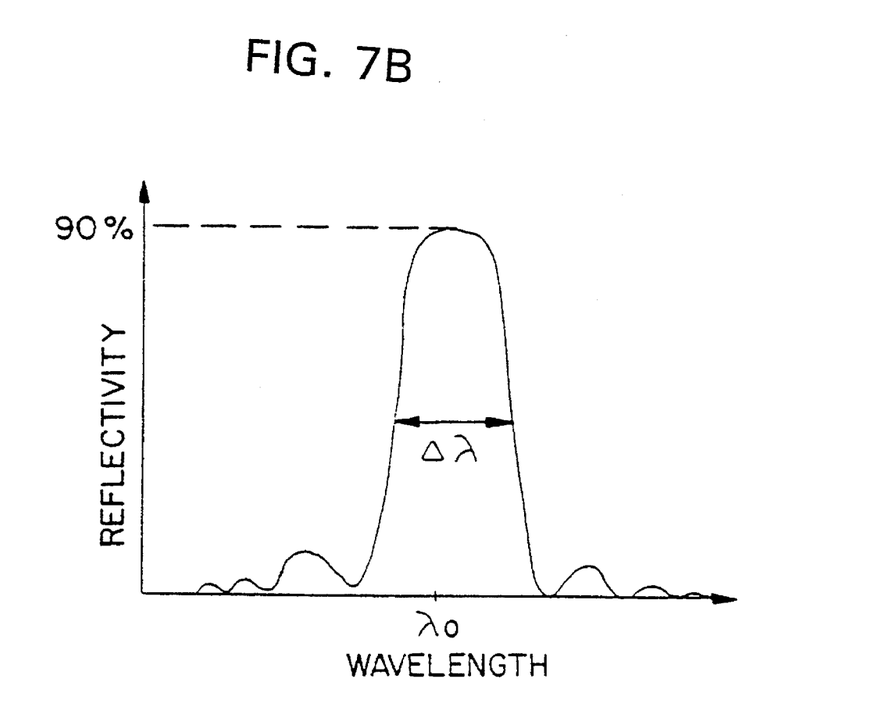
FIG. 7B is a graph showing reflectivity versus wavelength of the arrangement of FIG. 7A.

As shown in the embodiment of FIG. 7A, this arrangement of this invention provides compact, efficient, upconversion of diode lasers in the short wavelengths of the visible spectrum needed to enhance the density of optical memory in commercially available compact discs which operate on magneto-optic principles. Shorter wavelengths of the writing laser beam will ensure tighter focal spot on the disc and therefore denser optical memory can be stored. In the arrangement shown in FIG. 7A, a diode laser 25 which pumps an infrared beam 27 via objective 29 is passed through a DCM doped PMMA waveguide 13 in accordance with the invention. Two integrated grating reflectors 31, (known as Distributed Bragg Reflectors which may be fabricated holographically or by conventional lithographic techniques, are both well known arts) are located at the two ends of the waveguide and provide the feedback of the optical cavity (i.e. like mirrors in a conventional laser). The output beam 33 provides the visible laser output at the well known "stopband" ie. spectral band for high reflectivity, of the custom designed gratings. Reflectivity spectrum of a typical integrated Bragg reflector is shown in the graph of FIG. 7B, where the stopband is delta lambda.

(b) Flat panel displays

Figure 8A:
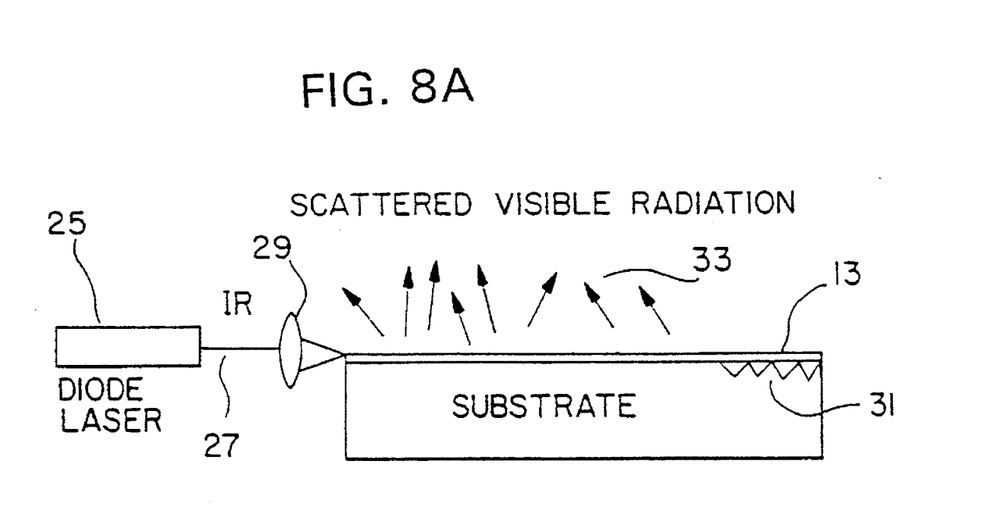
FIGS. 8A & 8B are diagrams showing respective flat panel displays in accordance with different embodiments of the invention.
Figure 8B:
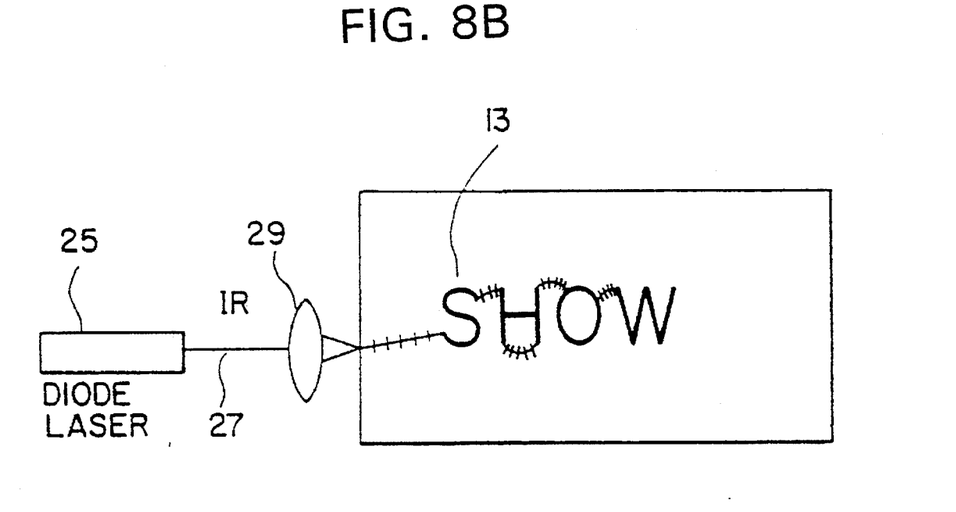

Displays are needed in automobiles, airplanes, or any instrument panel with a light source in the yellow band to provide maximum sensitivity for the human eye (for a review of flat panel displays please see "Display Technologies Vie for Commercial Leadership" by Alan Sobel, in Laser Focus World P153, October, 1991). Using the MU-LASERS of this invention for such displays is an improvement over the commercially available liquid crystal displays (e.g., in calculators, portable computers etc.) which have limited visibility and contrast when viewed at angles substantially different from 90 degrees. Liquid crystal displays are black and white contrast over an illuminated background and are not light sources by themselves as are the MU-LASERS of the invention. In accordance with the principle of this invention, as shown in FIG. 8A, the display provides a patternable, scattered, coherent light source (like that of the photograph shown in FIG. 6) with strong spectral brightness which is independent of viewing direction. The display arrangement as shown in FIG. 8A employs a diode laser 25 of any suitable well known design, producing an infrared beam 27 is passed through a microscope objective lens 29 and focused onto a patterned DCM dye doped PMMA waveguide 13 which produces output radiation covering the entire visible spectrum represented by the arrows 33, with essentially uniform intensity. An integrated Bragg reflector 31 (as in FIG. 7A), or other reflector may be placed at the other end of the waveguide reflecting the pump beam back through the waveguide passing through it a second time, enhancing the intensity of the emitted radiation 33. Thus in accordance with the invention, the display "SHOW" as shown in FIG. 8B, is produced. Between the letters the waveguide can be conveniently covered to block the radiation like in neon signs. The efficiency of the display can be increased by suitably increasing the scattering of the upconverted radiation using higher surface roughness waveguides or by adding scattering particles in the DCM doped PMMA solution. The fact that the pump beam can be propagated over long lengths allow the design of long display patterns with a single pump beam.

Surface emitting MU-LASERS (SEML)

The surface emitting MU-LASER (SEML) in accordance with this invention may also take the form of a uniform thin film of the said material, i.e., DCM doped in PMMA of appropriate thickness optimized for maximum conversion from IR to visible radiation. The pump IR beam is focussed perpendicular to the dye doped film from the substrate side, while the visible radiation from the lasing film is emitted on the other side. Also, in addition to the single waveguide form previously discussed, the SEML consists of planar intersecting waveguides with one or more pump beams focused for entry at the ends of the respective waveguides and for travel through the waveguides.

(a) HDTV for image broadcasting in the visible

Figure 9A:
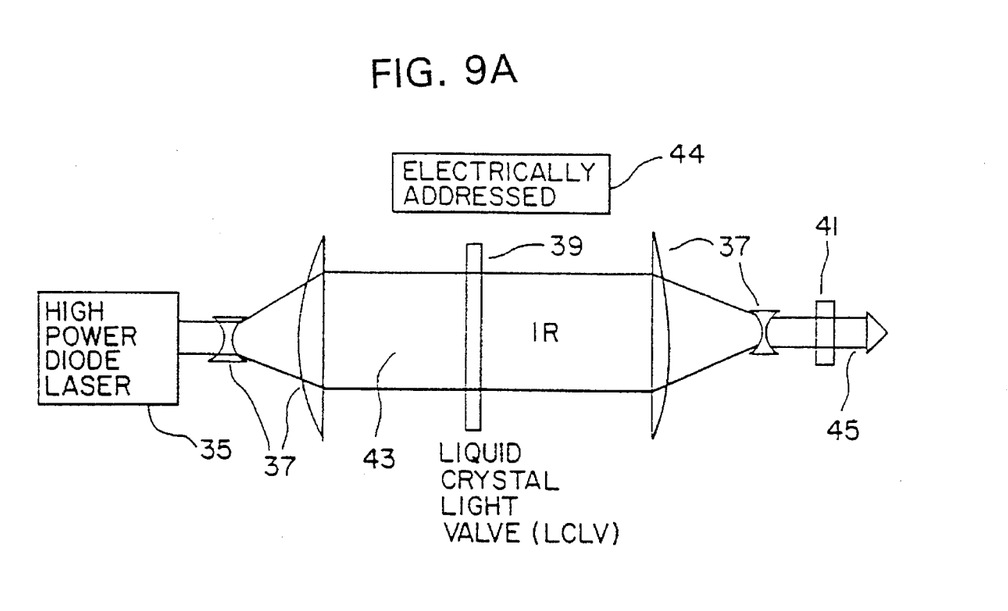
FIGS. 9A & 9B are diagrams showing the use of liquid crystal valve in accordance with respective embodiments of the invention to produce a high intensity full spectrum beam for large screen imaging and FIGS. 10A, 10B are respective diagrams showing pixel-addressed large panel HDTV in accordance with embodiments of the invention.
Figure 9B:
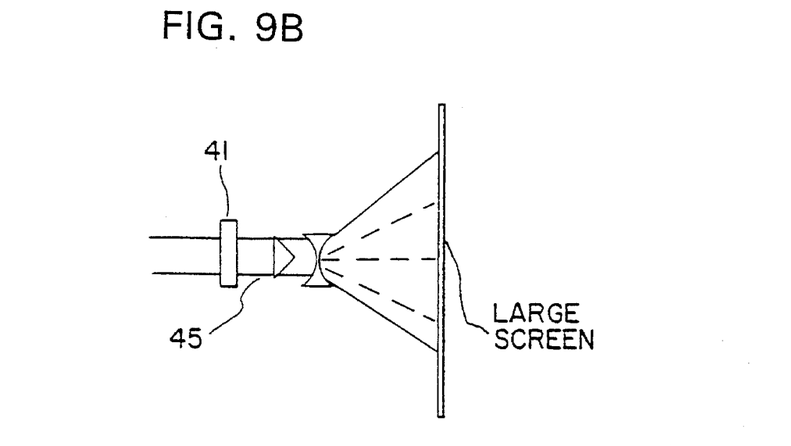

HDTVs are discussed in "HDTV: The World Awaits FCC Action", by Bob Compton in Optical Engineering Reports, #94, October, 1991. In accordance with the invention, compact, non-CRT type image broadcasting in the visible spectrum as provided by the SEML is shown in FIGS., 9A and 9B. A high power diode laser 35 produces a pump beam which is expanded and collimated using a suitable lens combination 37 to provide collimated pump beam 43 of IR wavelength. This beam is then passed through a liquid crystal valve (LCLV) image processor 39, or a spatial light modulator of any suitable well known construction employing the turn on/turn off electro-optic shutter principle. The dynamic turning on/off of the LCLV is electrically addressed (rastor scanned) by any suitable well known rastor control system 44 to represent a picture, build up of N×N matrix of pixels. The transmitted coherent IR beam carrying the image information, is contracted through a similar lens combination 37 after which it pumps the SEML 41 which maintains the spatial resolution and faithfully emits the image imposed by processor 39 in the visible spectrum 45. As shown in FIG. 9B, the visible spectrum beam 45 may be projected onto a large screen. Contraction of the IR beam is needed to excite multiphoton absorption in the SEML, considering the square dependence of the visible output intensity with the input intensity. With the advent of very high power diode lasers (McDonnell Douglas Electronic Systems Co; News Briefs, Photonics Spectra, October 1991) output powers more than 600 KiloWatts are becoming available in the infrared regions. This allows larger expansion of the IR beam, allowing larger visible display screens for the direct conversion of IR images to the entire visible spectrum.

(b) Large area HDTV for image broadcasting in the visible

Figure 10A:
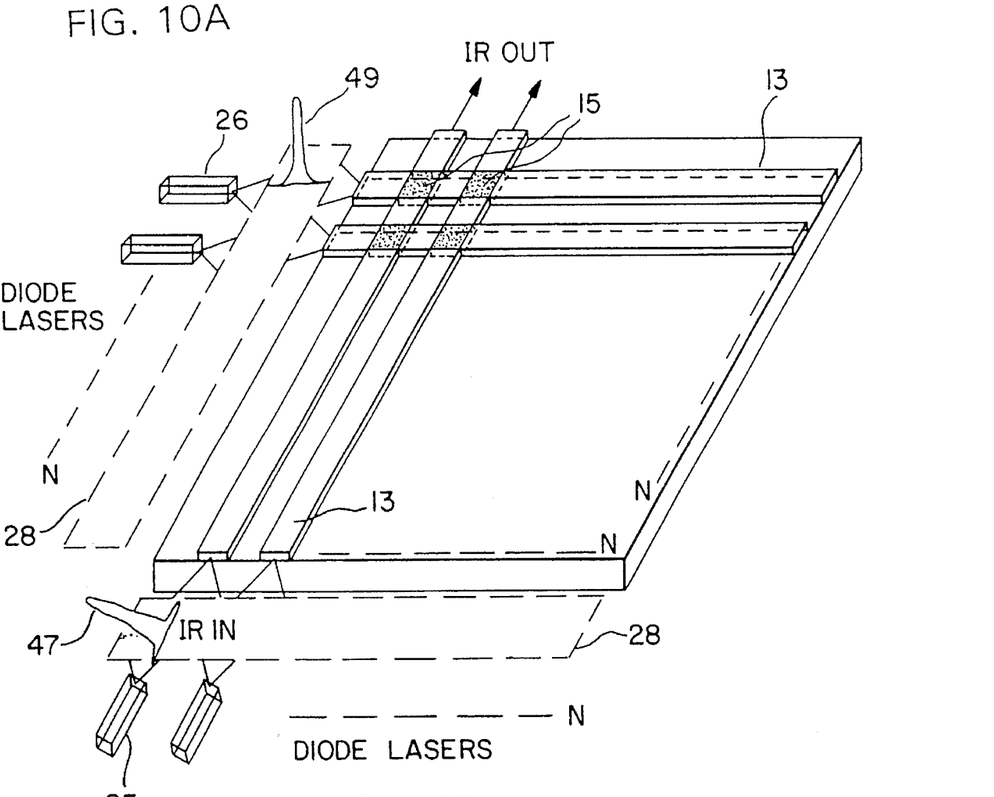
Figure 10B:
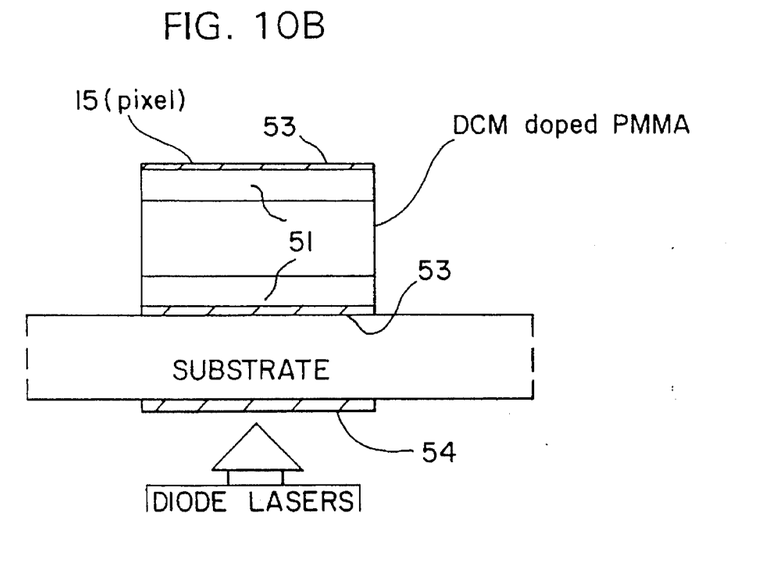

Large area HDTV in accordance with the invention is shown in FIGS. 10A and 10B and consists of the following components:

(1) N rows and N columns ( N×N) of straight planar intersecting DCM doped PMMA waveguides 13 in the same plane fabricated on a single substrate, suitably fused silica. The waveguides are typically 5 micrometers thick and wide, separated by 10 micrometers, center to center.

(2) N rows and N columns of transparent conducting electrodes 53 (e.g., indium tin oxide), of same width as the waveguides are suitably deposited on the bottom and top of the N rows and N columns of DCM doped PMMA waveguides with dielectric spacers 51 between the electrodes and the dye doped PMMA waveguides to reduce propagation loss of the pump IR radiation (for a schematic please see the article by Alan Sobel referred to earlier). The fabrication steps of this structure are straight forward from well known art in Microelectronics.

(3) N rows and N columns of diode laser banks 25 and 26 emitting IR radiation in accordance with the invention.

(4) Fiber couplers 28 for coupling the IR radiation from the diode laser banks to the waveguides, such as are discussed in the Special Issue on "Optical Interconnects", Ed. J. W. Goodman and L. D. Hutcheson in APPLIED OPTICS, Vol. 29, No.8, 10 Mar., 1990 and "The pros and Cons of Single-Mode Connectorized Laser Diodes", by G. Rogers and P. Berrang in PHOTONICS SPECTRA, pg. 111, October, 1991.

The principle on which this large area HDTV (shown in FIG. 10 A & B) works, is as follows. Picosecond infrared pulses 47 and 49, from one bank of N diode lasers in row 25 and another bank of N diode lasers in column 26 are used for providing the pump pulses which are coupled to the 2N intersecting waveguides 13 to form N×N crosspoint pixels 15. Fiber couplers 28 may be conveniently employed between the diode laser banks 25 and 26 and the input ends of the waveguides 13.

Consider two infrared optical pump pulses 47 and 49 from diode lasers 25 and 26 in the infrared wavelength in accordance with the invention, travelling down the respective waveguides. The scattered upconverted lasing intensity (see Figures 8A & 8B) at the crosspoint pixel 15, when the pump pulses arrive at different times, is proportional to $2I^2$ where I is the intensity of each of the pump pulses in the respective waveguides. In accordance with well known optical principles when the two pump pulses arrive at the crosspoint at the same time (time delay between pulses=0 at the pixel), they are in phase addition thus producing an upconverted lasing intensity which is proportional to the square of the total pump intensity or $16I^2$. Reference is made to prior art of characterizing ultrashort light pulses by second order autocorrelation techniques ("Femtosecond Dye Lasers", by J.-C. Diels, in Chapter 3 of "Dye Laser Principles, with Applications", Ed. F. Duarte and L. W. Hillman, Academic Press Inc.).

The timing of the pump pulses 47, 49 can be conveniently adjusted by electrically controlling the bias of the 2N diode lasers banks 25 and 26. The 16:1 ratio (pulses constructively interfering at zero delay: pulses completely separate) of the intensity of the upconverted lasing can be only achieved when the timing of the pump pulses is controlled with the accuracy of the phase of the electric field of each pump pulse. If such an accuracy cannot be achieved, (i.e., the fringes of interfering pulses are washed out), the above ratio reduces to 3:1 (as explained by J.-C. Diels in the article cited above). This provides sufficient picture-to-background contrast from this HDTV arrangement shown in FIG. 10A. Minimum and maximum contrast ratio available in accordance with this invention are approximately 3:1 and 8:1 respectively. Also the time delay between the arrival of the pump pulses 47, 49 at each pixel 15 is a control mechanism for continuous change of intensity from the maximum to the minimum. In this way the intensity of the upconverted visible radiation from the pixel can be tuned from the background to the maximum value (3:1 or 8:1) depending on how accurately the phase of the pump pulses is controlled). The intersecting waveguides can be conveniently blocked on the top of the waveguides, except at the crosspoints or pixels to reduce background radiation glare.

The MU-LASER provided by this invention is capable of operating in the RED - BLUE - GREEN visible radiations, the primary colors needed for television broadcasting in full color. The color, made up of these primary colors, of each lasing pixel 15 may be varied by temperature and/or electric field color tuning as is well known in the art.

It is well known that dye lasers can be tuned to varied degrees by the application of external applied electric field (Stark tuning) and temperature. The electric field tuning for each pixel is also shown is FIG. 10B. This scheme is borrowed from conventional liquid crystal display technology i.e., an N×N matrix of top and bottom transparent electrodes 53 (shown in FIG. 10B and not shown in FIG. 10A to ensure clarity of the figure) with the intersections matching with the intersections of the waveguides. The electrical tuning is done by the matching of high and low voltage at the intersections i.e., at the pixels where the longitudinal electric field may Stark-tune the lasing spectrum. The simultaneous adjustment of intensity and tuning of pixel 15 is done by electrically programming the bias of diode laser banks 25 and 26 providing pulses 47 and 49 of the optical lines for intensity adjustment and rastoring the electrical row and column lines for electrical tuning in accordance with well known principles.

Temperature tuning can be done by locally heating the pixel with an appropriately focussed pulsed diode laser beam from the back of the substrate as shown in FIG. 9B. An evaporated metal (e.g., gold of 100 nm thickness) spot 54 of appropriate thickness under the pixel 15 will absorb the IR diode laser beam and heat the laser pixel above it locally for a short time (microseconds) allowing temperature tuning of the laser pixel.

Complete rastor scanning is thus possible in the HDTV principle described above. This raster scanning is done by appropriately controlling the electrical bias on the diode lasers thereby controlling the time delay of arrival of the pump pulses at the pixels emitting the visible radiation. At the same time of the optical rastor scan, electrical and/or temperature rastor scanning can be performed to tune the color of the pixels. This provides the capability for HDTV broadcasting in full color.

Other arrangements within the scope of the invention will occur to those skilled in the art, and the scope of the invention is limited only by the following claims.

I claim:

1. The method of producing an essentially coherent source of electromagnetic radiation having substantial intensity over at least the entire visible spectrum comprising:
   a) pumping a beam of essentially infrared, coherent electromagnetic radiation into a body of material capable of simultaneous multiphoton absorption and upconversion fluorescence, said beam having characteristics and an intensity level sufficient to produce two-photon pumped upconverted lasing in said body whereby essentially coherent electromagnetic radiation having substantial intensity over at least the entire visible spectrum is emitted from said body.

2. The method of claim 1 wherein the body has approximately $10^{-3}$ mole concentration of DCM dye in BZOH solution homogeneously mixed in PMMA.

3. The method of claim 1 wherein wavelength of said infra-red beam is about 740 nm.

4. The method of claim 1 wherein the body comprises a waveguide one end of which receives said essentially infrared beam.

5. The method of claim 4 wherein the body is a thin film disposed on a substrate.

6. The method of claim 4 wherein the waveguide further comprises an integrated Bragg reflector at the other end thereof.

7. The method of claim 4 wherein the waveguide further comprises an integrated Bragg reflector at both ends.

8. The method of claim 4 including the further step of
   b) focussing the infra-red radiation into said one end of the waveguide.

9. The method of claim 4 wherein the coherent radiation emitted therefrom is essentially parallel to the plane of the waveguide.

10. The method of claim 1 wherein the infrared beam is characterized by a train of pulses each of about 4 pico seconds width at about 82 MHz and about 30 mW continuous wave power.

11. The method of claim 1 comprising the further step of
    b) filtering the visible radiation emitted from the waveguide to produce the coherent radiation.

12. The method of claim 11 wherein the filtering produces coherent radiation having a dominant frequency in the yellow band.

13. The method of claim 1 including the further step of
    b) varying the frequency of either the infrared beam or the emitted coherent radiation, or both.

14. The method of claim 1 wherein the coherent radiation in the visible spectrum is emitted essentially in all directions from the plane of said body.

15. Laser apparatus for producing desired coherent output radiation having substantial intensity levels thoughout at least the entire visible spectrum comprising:
    a) a substrate;
    b) an essentially planar body of material mounted on said substrate, said material being capable of simultaneous multiphoton absorption, and upconverted fluorescence, and
    c) a source of pumping radiation providing a beam of radiation directed into said body, said pumping radiation comprising a pulse train of coherent, essentially infrared radiation having characteristics and an intensity level sufficient to produce two-photon pumped upconverted lasing in said body whereby the desired radiation is emitted therefrom.

16. The apparatus of claim 15 wherein the pumping radiation is further characterized by an average power of about 30 mW and is in the form of a pulse train wherein each pulse is of about 4 picoseconds duration.

17. The apparatus of claim 16 wherein the wavelength of the pumping radiation is about 740 nm.

18. The apparatus of claim 15 wherein said body is in the form of a waveguide arranged on a substrate to receive said beam at one end thereof.

19. The apparatus of claim 15 wherein said body is in the form of a thin film arranged on a substrate.

\* \* \* \* \*